United States Patent

Petignat

[11] Patent Number: 5,764,337
[45] Date of Patent: Jun. 9, 1998

[54] LOCKING FASTENER FOR SPECTACLE TEMPLE PIECE

[75] Inventor: Maurice Petignat, Rue du Bois-Noir 27, La Chaux-de-Fonds, Switzerland

[73] Assignees: Maurice Petignat, Switzerland; Etablissements Sarran S.A., France

[21] Appl. No.: 737,148
[22] PCT Filed: Apr. 27, 1995
[86] PCT No.: PCT/IB95/00303
§ 371 Date: Nov. 4, 1996
§ 102(e) Date: Nov. 4, 1996
[87] PCT Pub. No.: WO95/30838
PCT Pub. Date: Nov. 16, 1995

[30] Foreign Application Priority Data

May 4, 1994 [CH] Switzerland ............ 01406/94

[51] Int. Cl.$^6$ .................. G02C 5/22; G02C 5/00
[52] U.S. Cl. ............... 351/153; 351/141; 16/228
[58] Field of Search .................... 351/111, 121, 351/153, 140, 141; 16/228

[56] References Cited

U.S. PATENT DOCUMENTS 4,153,347  5/1979  Myer .......................... 351/90

FOREIGN PATENT DOCUMENTS 1212655  3/1960  France.
2623920  6/1989  France.

*Primary Examiner*—Huy Mai
*Attorney, Agent, or Firm*—Silverman, Cass & Singer, Ltd.

[57] ABSTRACT

A screw extending through the knuckles of the arm hinge of a pair of spectacles and having a threaded end screwed into one knuckle. The part of the screw that extends beyond said knuckle has an annular groove recieivng a circlip which engages the outer surface of the knuckle to prevent inadvertent loosening of the screw with its head held in engagement with the knuckle. The size of the annular groove receiving the circlip is such that said groove is partially located within the knuckle. As a result, should the assembly become loose, it can be tightened again by replacing said circlip with another slightly thicker circlip.

1 Claim, 1 Drawing Sheet

LOCKING FASTENER FOR SPECTACLE TEMPLE PIECE

This invention relates to a spectacles frame and to an articulation device of its sides on its facial portion by means of hinges the axis of which is constituted by a screw screwed in one of the knuckles of one of the elements of the hinge and which passes through a passage provided in a knuckle of the other element.

The articulation devices of sides of spectacles of the above mentioned type are known per se. U.S. Pat. No. 2,926,381 discloses an arrangement of this type.

The object of the present invention is to improve the reliability of such articulation devices producing a locking of the assembling screw.

This object is achieved owing to the fact that the screw goes beyond the knuckle in which it is screwed, this screw showing, situated flush with the face of said knuckle, beyond which it protrudes, an annular groove in which is engaged a circlip producing the locking of the screw preventing the latter to be untimely loosened.

It is to be noted that French Patent No. 1.212.655 and French Patent Application No. 2.623.920 disclose articulations devices of sides of spectacles in which the axis of the hinge is constituted by a smooth stem locked by means of a circlip.

Such an arrangement is well known in the field of general mechanics, as Belgian Patent No 469.209 will be sufficient to be evidence thereof, in which, moreover;. the locking circlip of an axis is cambered in such a way as to produce a resilient return of this axis.

Another object of the invention lies in the fact of realizing such an articulation device which is efficient in spite of the variations of the position of the screw constituting the axis of articulation can occupy when the desired tightening is obtained.

This other object is achieved owing to the fact that the width of the annular groove provided in the stem of the screw is such that this groove is partially situated inside the knuckle of the element of the hinge in which the screw is screwed, in such a way that, according to the longitudinal position of the said screw with respect to the said knuckle, circlips of several thicknesses can be used so as to produce an efficient locking of the screw.

The drawing shows, by way of example, one embodiment of the object of the invention.

Figure 1:
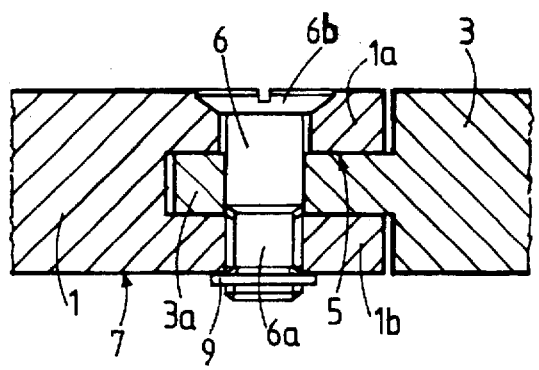
FIG. 1 is an axial sectional view of a hinge for sides of spectacles.
Figure 2:
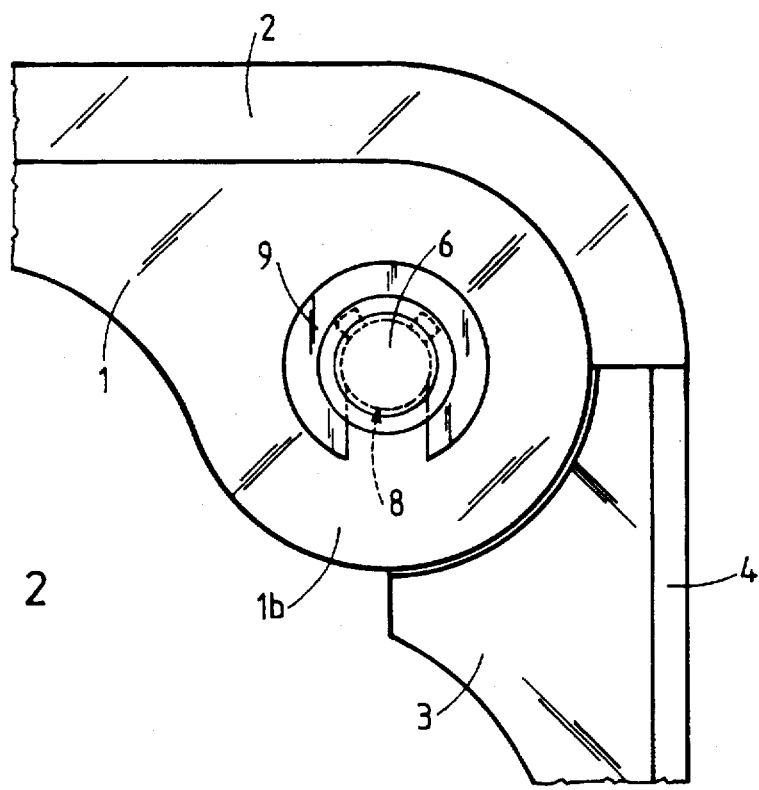
FIG. 2 is a plan view, from the bottom, of this hinge, to a larger scale.
Figure 3:
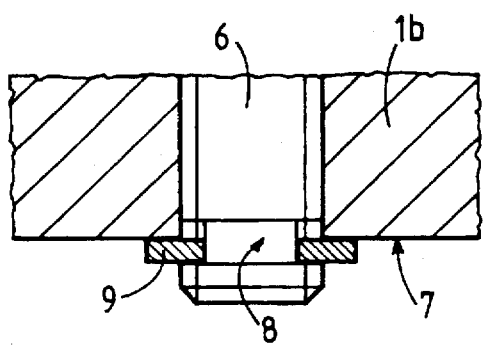
FIG. 3 is a sectional view of a detail of this hinge, to the scale of FIG. 2.

The hinge represented comprises a sole 1 intended to be secured to the facial part 2 of a spectacles frame, and a sole 3 secured to a side 4 of the said frame.

A notch 5 is provided in the sole 1 constituting this way two knuckles 1a and 1b between which is engaged a protrusion 3a of the sole 3, constituting a knuckle, the whole constituting this way the hinge of articulation of the side 4 on the facial part 2 of the spectacles frame.

A journaled screw 6 passes through the two knuckles 1a and 1b, as well as the knuckle 3a of the hinge, its end, designated by reference 6a, which is threaded, being screwed in the knuckle 1b.

This screw extends beyond the knuckle 1b, its protruding portion presenting, flush with the outer face, designated by reference 7, of the knuckle 1b, an annular groove 8 situated flush with the said face 7. A pinch washer 9, known by the name of circlip, is engaged in the groove 8 and bears on the face 7 of the knuckle 1b for ensuring that the screw 6, the head of which, designated by reference 6b, is locked against the knuckle 1a, does not risk loosening untimely.

The height of the groove 8 is such that the latter is situated, partially, inside the knuckle 1b. Hence, if the articulation takes play, for instance due to wear of the elements which constitute it, that is frequently the case of the hinges of spectacles frames, which are much utilized, it is possible to compensate this play while replacing the circlip 9 by a circlip of a thickness slightly superior.

Thus, the present arrangement settles at the same time the problem of the untimely loosening of a screw assembling of two elements and this one of the compensation of a possible play.

The invention is not restricted to the case disclosed and represented of hinges of spectacles. It can be applied to any assembling using a screw, even to the assembling of elements which are not articulated to each other, even if, in this case, the risk of appearance of play is obviously lower.

The invention can also be applied to the case where the screw is not directly screwed in one of the members to be assembled but to the case where the assembling is provided with a nut. The screw will then extend beyond the said nut and it is against the latter that the circlip will bear.

I claim:

1. A locking fastener for spectacle temple piece having a facial portion and a side portion pivotally connected to said facial portion about a passage forming a pivot axis, said locking fastener comprising, a screw passing through said passage, one end of the screw extending beyond a surface of said spectacle, said one extending end of the screw having an annular groove, said annular groove being of an axial dimension such that the groove is positioned partially within said passage and partially exposed to said surface of the spectacle, and a circlip engaged within said groove by locking force to lock the screw within the passage to prevent removal of said screw, whereby circlips of varying thickness may selectively be engaged within said groove to adjust the locking force applied to the screw.

\* \* \* \* \*